(12) United States Patent
Bourlon

(10) Patent No.: US 10,597,017 B2
(45) Date of Patent: Mar. 24, 2020

(54) ELECTRIC AND FLUID PASSAGE DUCT FOR CONTROLLING A SEAL IN A VEHICLE BRAKE

(71) Applicant: FOUNDATION BRAKES FRANCE, Drancy (FR)

(72) Inventor: Philippe Bourlon, Dammartin en Goele (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 108 days.

(21) Appl. No.: 16/063,563

(22) PCT Filed: Dec. 20, 2016

(86) PCT No.: PCT/EP2016/081924
§ 371 (c)(1),
(2) Date: Jun. 18, 2018

(87) PCT Pub. No.: WO2017/108792
PCT Pub. Date: Jun. 29, 2017

(65) Prior Publication Data
US 2019/0001950 A1 Jan. 3, 2019

(30) Foreign Application Priority Data

Dec. 22, 2015 (FR) ..................... 15 63067

(51) Int. Cl.
*B60T 17/22* (2006.01)
*F16D 55/226* (2006.01)
(Continued)

(52) U.S. Cl.
CPC .......... *B60T 17/221* (2013.01); *F16D 55/226* (2013.01); *F16D 65/18* (2013.01); *F16D 2121/24* (2013.01); *F16D 2125/46* (2013.01)

(58) Field of Classification Search
CPC ...................................................... B60T 17/221
See application file for complete search history.

(56) References Cited

U.S. PATENT DOCUMENTS

| 9,623,851 B1 * | 4/2017 | Cymbal | ................ B60T 8/1766 |
| 2003/0083797 A1 * | 5/2003 | Yokoyama | ............ B60T 13/741 701/70 |

(Continued)

FOREIGN PATENT DOCUMENTS

| JP | 2003-042198 A | 2/2003 |
| JP | 2004-320844 A | 11/2004 |
| JP | 2008-207640 A | 9/2008 |

OTHER PUBLICATIONS

International Search Report dated Mar. 17, 2017 in PCT/EP2016/081924 filed Dec. 20, 2016.

(Continued)

*Primary Examiner* — Melanie Torres Williams
(74) *Attorney, Agent, or Firm* — Oblon, McClelland, Maier & Neustadt, L.L.P.

(57) ABSTRACT

An electromagnetic brake actuator for a vehicle. The actuator includes a motor, a casing defining an inner space containing the motor, and an electric connector leading to outside of the actuator. The actuator includes a duct in which an electric conductor is placed, which electrically connects the motor to the electric connector. The duct is configured to allow fluid to pass between the electric connector and the inner space, through the electric connector.

10 Claims, 3 Drawing Sheets

(51) Int. Cl.
*F16D 65/18* (2006.01)
*F16D 121/24* (2012.01)
*F16D 125/46* (2012.01)

(56) References Cited

U.S. PATENT DOCUMENTS

2015/0360671 A1* 12/2015 Williams ............... F16D 66/02
 701/70
2016/0146279 A1* 5/2016 Philpott ................. B60T 8/885
 188/1.11 L

OTHER PUBLICATIONS

French Preliminary Search Report dated Aug. 11, 2016 in French Application 1563067 filed Dec. 22, 2015.
U.S. Appl. No. 16/060,777, filed Jun. 8, 2018, Philippe Bourlon, et al.

* cited by examiner

ELECTRIC AND FLUID PASSAGE DUCT FOR CONTROLLING A SEAL IN A VEHICLE BRAKE

TECHNICAL FIELD

The invention relates to vehicle brakes and to monitoring brake tightness. It relates in particular to monitoring tightness between the actuator and the caliper body of a car brake.

STATE OF PRIOR ART

Brake calipers comprise a caliper body and a brake electromechanical actuator. The caliper body encloses a piston.

The electromechanical actuator includes a motor, a transmission device and an electric connector for electrically supplying the actuator. The transmission device is configured to move the piston, when it is driven by the motor.

The actuator and the caliper body are tightly coupled to each other. However, there is a need for monitoring tightness of the brake caliper, before it is put up for sale or positioned on a vehicle.

DISCLOSURE OF THE INVENTION

In this regard, one object of the invention is an electromechanical actuator for a vehicle brake. The actuator comprises a motor, a casing delimiting an inner space enclosing the motor, and an electric connector opening outwardly of the actuator.

According to the invention, the actuator comprises a duct in which an electric conductor which electrically connects the motor to the electric connector is located, wherein the duct is configured to allow fluid to pass between the electric connector and the inner space, through the electric connector.

The duct enables tightness of the actuator and of the brake caliper to be more efficiently monitored when the actuator is coupled to the caliper body. In particular, the time necessary for monitoring caliper tightness is reduced and the cost for this monitoring is decreased.

The duct which is created to convey current towards the motor is also used to allow fluid to pass in the actuator, in order to monitor tightness thereof.

The invention can optionally include one or more of the following characteristics combined with each other or not.

Advantageously, the electric connector is configured to be connected to a complementary electric connector, wherein the electric connector is fluid tight when it is connected to the complementary electric connector.

The invention also relates to a brake caliper comprising a caliper body, and an actuator as defined above, the casing comprising a mounting surface to tightly couple the actuator to the caliper body.

Advantageously, the caliper body is a floating caliper body.

Advantageously, the brake caliper comprises a seal between the actuator and the caliper body, wherein the duct is configured to test fluid tightness between the actuator and the caliper body.

The invention also relates to a method for checking tightness of a brake caliper as defined above.

The checking method comprises a step of connecting the duct to a pressure varying device, for varying fluid pressure in the caliper. The fluid is preferably air.

Advantageously, the checking method then comprises a step of measuring a value representative of the fluid pressure at the electric connector and/or at the mounting surface.

Advantageously, the checking method comprises:

a step of measuring a duration necessary for the value representative of the pressure to reach a determined pressure value, a step of comparing the duration measurement to a reference duration, and emitting a signal representative of a tightness fault of the caliper if the absolute value of the deviation between the duration measurement and the reference duration exceeds a threshold value.

BRIEF DESCRIPTION OF THE DRAWINGS

The present invention will be better understood upon reading the description of exemplary embodiments, given by way of purely indicating and in no way limiting purposes, making reference to the appended drawings in which.

Identical, similar or equivalent parts of the different figures bear the same reference numerals so as to facilitate switching from one figure to the other.

DETAILED DISCLOSURE OF PARTICULAR EMBODIMENTS

Figure 1:
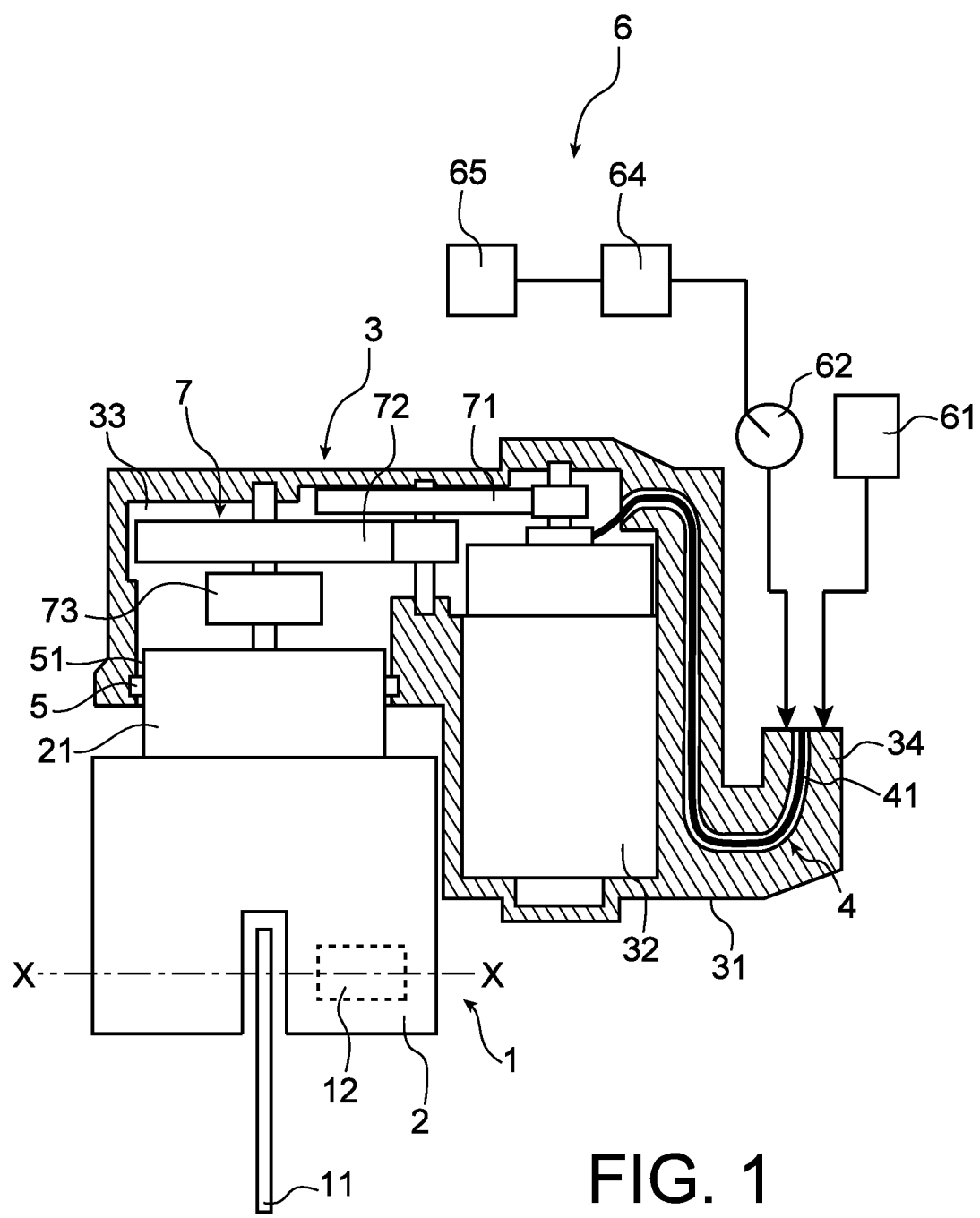
FIG. 1 is a partial schematic representation of a brake caliper and a tightness checking system, according to a first embodiment of the invention.

FIG. 1 represents a brake caliper 1 for an automobile vehicle, as well as a monitoring system 6 which is configured to monitor tightness of the caliper 1, in particular between the actuator 3 and the caliper body 2.

The caliper 1 is a floating type caliper. It is designed to be used in a disc brake 11, of the electromechanical type. This disc brake 11 is for example a parking brake configured to brake a wheel typically, the rear wheel of the vehicle. Besides, the caliper 1 includes a hydraulic activation ensuring service braking.

The caliper 1 includes a caliper body 2 and a brake electromechanical actuator 3.

The caliper body 2 includes a casing or an inlet interface 21 which is used to secure the caliper body 2 to the actuator 3.

The caliper body 2 houses a piston 12 which is located, at least partially, in the extension of the inlet casing 21 along the longitudinal direction X-X of the caliper body 2. This piston 12 is translationally movable along the longitudinal direction X-X of the caliper body 2, under the effect of the actuator 3.

The caliper body 2 also houses a brake disc 11 between two brake pads (not represented). The disc 11 is located opposite the inlet casing 21 relatively to the longitudinal direction X-X of the caliper body 2.

The caliper 1 is configured such that the piston 12 is moved upon braking of the vehicle wheel, by causing the pads to move closer to each other such that they clamp the disc 11.

The actuator 3 includes an external casing 31, a motor 32, a transmission device 7 and an electric connector 34.

The motor 32 is an electric motor configured to drive the transmission device 7. It is for example of the brush type.

The transmission device 7 includes a first gear train 71 for being mechanically driven by the motor 32, a second gear train 72 for being driven by the first gear train 71, and a third gear train 73 which is coupled to the piston 12.

The transmission device 7 is designed to move the piston 12 translationally along the long axis of the longitudinal axis X-X of the caliper body, under the action of the motor 32.

The electric connector 34 is a male, female or androgynous connector which is configured to be electrically connected to a female, male or androgynous electric connector 84 (FIG. 2) having a complementary shape to that of the electric, for example male connector 34.

The male connector 34 is configured to electrically supply the actuator 3, being air and water tight, when it is connected to the female connector 84.

The casing 31 is manufactured by moulding. It delimits an inner space 33 of the actuator 3, wherein the motor 32 and the transmission device 7 are housed.

The electric connector 34 of the actuator 3 is integrated in the casing 31, upon moulding the casing 31. It opens from the casing 31 outwardly of the actuator 3.

The casing 31 includes a mounting external surface 51 which delimits an aperture for receiving the inlet casing 21 of the caliper body 2. The aperture opens into the inner space 33, to mechanically couple the transmission device 7 to the piston 12.

The inlet casing 21 is for being tightly attached to the mounting surface 51, to tightly couple the actuator 3 to the caliper body 2.

The aperture houses a tight seal 5 which is located between the actuator 3 and the caliper body 2. The seal 5 is located against the external mounting surface 51 on the one hand and against the inlet casing 21 of the caliper body 2 on the other hand.

For the caliper 1 to properly work, this has to be liquid tight. In particular, it has to be water tight, since water would otherwise be likely to be introduced in the actuator 3 and to deteriorate it prematurely.

Figure 2:
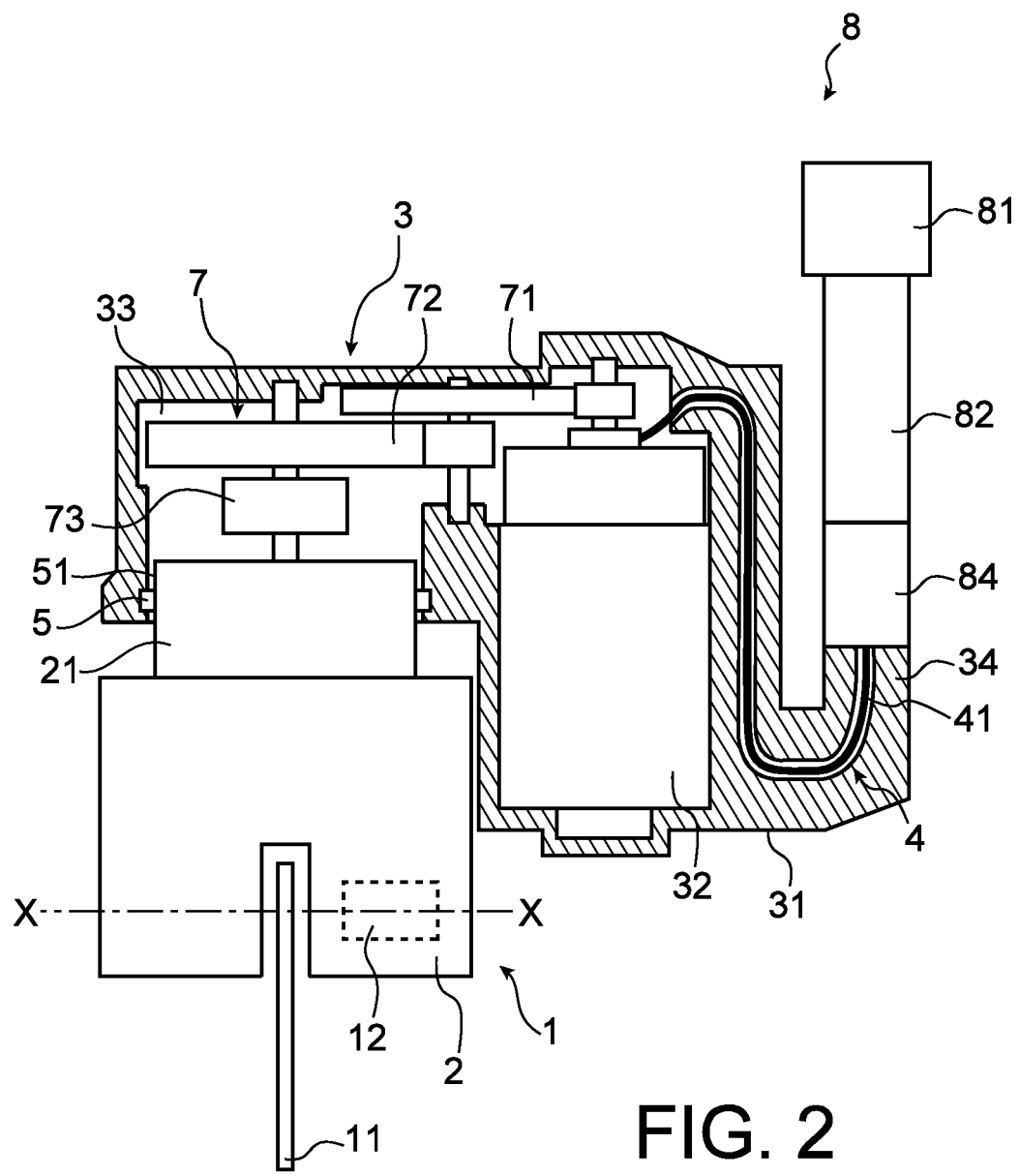
FIG. 2 is a partial schematic representation of the brake caliper, according to the first embodiment, when it is connected to the electric circuit of the vehicle.

In reference to FIG. 2, the electric connector 34 is for electrically supplying the actuator 3, with electricity from the battery 81 of the vehicle. It is configured to electrically supply the motor 32 through at least one electric cable 41.

The electric circuit of the vehicle 81 is electrically connected to the female electric connector 84 through electric cables 82. The female electric connector 84 is configured to mechanically engage the male connector 34, being electrically connected to the male conductor 34.

In reference to FIG. 1 again, the electric cable 41 is located inside a duct 4 which is provided inside the casing 31, instead of being integrated by moulding in the casing 31. This electric cable 41 extends from the connector 34 to the motor 32. It is used as an electric conductor to convey current from the connector 34 to the motor 32.

The duct 4 houses the electric cable 41 throughout all the cable 41. It takes the form of a recess provided in a wall of the casing 31. It extends from the connector 34 where it opens outwardly of the actuator 3, up to the motor 32 where it opens into the inner space 33.

The duct 4 also forms a passage for flowing a fluid, typically air, from outside the actuator 3 to the mounting surface 51.

The duct 4 of the actuator 3 and the tightness monitoring system 6 aims at more efficiently monitoring tightness of the brake caliper 1.

The tightness monitoring system 6 includes a pump, a pressure gauge 62 located in the proximity of the pump, a computer processing unit 64 connected to the outlet of the pressure gauge 62, and an alert device 65 connected to the outlet of the processing unit 64.

The pump plays the role of an air injection device 61 configured to introduce pressurised air into the duct 4, through the electric connector 34. More generally, the air injection device 61 plays the role of a pressure varying device configured to vary fluid pressure in the duct 4.

The pressure gauge 62 is configured to measure air pressure at the electric connector 34 and transmit a signal representative of a pressure measurement to the processing unit 64.

The processing unit 64 comprises a microprocessor and a memory. It is configured to process the signal representative of a pressure measurement from the pressure gauge 62, to transmit optionally a signal representative of a tightness fault of the caliper 1.

The alert device 65 is configured to receive a signal representative of a tightness fault from the processing unit 64, and to transmit a tactile, sound and/or visual alert accordingly to a user to inform him/her of the tightness fault risk of the caliper 1.

Figure 3:
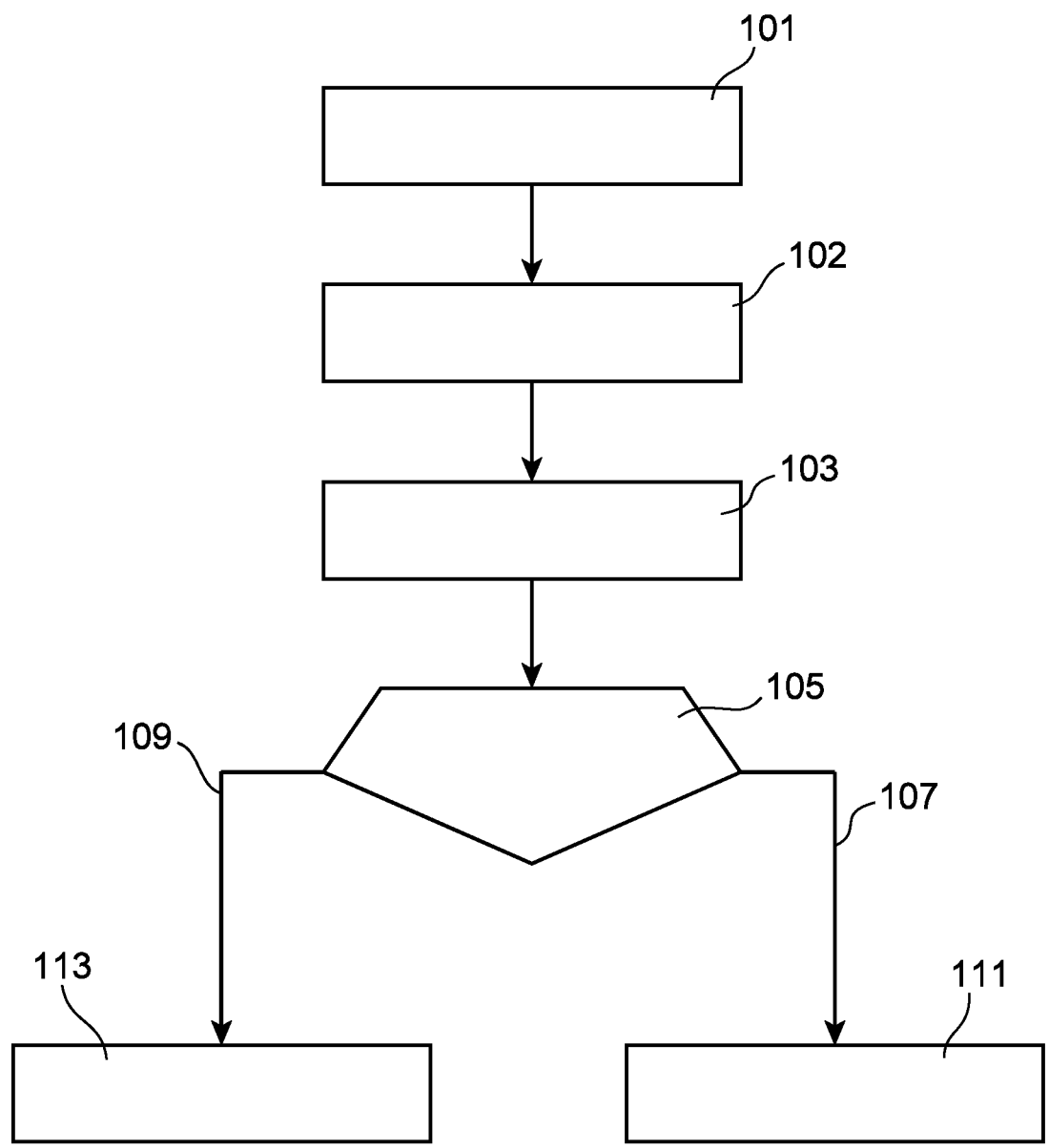
FIG. 3 illustrates a method for monitoring tightness of the brake caliper according to the first embodiment.

A method for checking tightness of the caliper 1 using the duct 4 and the monitoring system 6 is illustrated in reference to FIG. 3.

First, the air injection device 61 is fluidly connected to the actuator 3, in a step 101, to inject pressurised air in the duct 4 through the electric connector 34.

In a step 102, the pressure gauge 62 measures air pressure in the duct 4, when air is being injected into the duct 4 by the injection device 61.

In a step 103, the processing unit 64 measures the duration necessary for the pressure measured in the duct 4 to reach a determined pressure value which is a predetermined fixed value. This duration is for example determined in reference to the pressurised air injection start time in the duct 4.

In a step 105, the processing unit 64 compares the duration measurement necessary for the pressure in the duct 4 to reach the determined pressure with a reference duration.

If the absolute value deviation between the duration measurement and the reference duration exceeds a threshold value, which is predetermined or input by a user, the checking method continues, according to the arrow 107, by signalling a tightness fault of the caliper 1 by the processing unit 64, in step 111.

If the absolute value deviation between the duration measurement and the reference duration is lower than the threshold value, the checking method continues, according to the arrow 109, by signalling the absence of tightness fault of the caliper 1 by the processing unit 64, in step 113.

When the processing unit 64 has emitted a signal representative of the tightness fault in step 111, the alert device 65 then transmits a tactile, sound and/or visual alert to a user to inform him/her of the tightness fault risk of the caliper 1.

When the processing unit 64 has emitted a signal representative of the absence of tightness fault in step 113, the alert device 65 does not transmit an alert to a user to inform him/her of the tightness fault risk of the caliper 1. The alert device 65 can also signal to the user the absence of tightness fault detected by the monitoring system 6.

The duct 4 and the tightness monitoring system 6 are all the more intended to monitor tightness at the seal 5 as tightness faults of the caliper 1 essentially come from an improper placement of the seal 5 between the inlet casing 21 and the mounting surface 51, or a manufacturing fault of the seal 5 or the absence of the seal 5.

The duct 4 and the monitoring system 6 advantageously enable non-destructive tightness tests to be made.

The monitoring system 6 is then advantageously used to monitor tightness of each caliper 1 manufactured, in particular between the actuator 3 and the caliper body 2, before the caliper 1 is marketed.

Of course, various modifications can be provided by those skilled in the art to the invention just described without departing from the scope of the invention.

In one alternative embodiment, the method for checking tightness of the caliper 1 comprises comparing the measurement of the value representative of the pressure with a reference value, after a determined duration has elapsed, either after air injection starts, or after air injection ends. This step replaces step 105 of comparing the duration measurement with a reference duration.

The checking method thereby comprises emitting a signal representative of a tightness fault of the caliper 1, when the absolute value deviation between the measurement of value representative of the pressure and the reference value exceeds a threshold value.

The duct 4 and the tightness monitoring system 6 are used to check tightness of the caliper 1. They can be used in particular to check tightness of the actuator 3 alone, such as when the mounting surface 51 is closed.

The injection device 61 is configured to inject air but it can inject other fluid types, for example nitrogen or an inert gas. The fluid injected can also be a liquid, for example dielectric oil, with the proviso that it does not deteriorate the caliper 1 or the electric motor 32.

When the fluid injected is a fluid other than air, the fluid injection device 61 preferably includes a fluid reservoir, for example under pressure. In this case, the fluid injection device 61 can be free from a pump.

The air injection device 61 can also be replaced by an air suction device, for sucking air from the duct 4, to check tightness of the caliper 1. In this case, the pressure gauge 62 is used to measure a vacuum level.

Alternatively, the injection device 61 can be located in the proximity of the mounting surface 51, so as to inject/suck air in the proximity of the mounting surface 51 to monitor tightness of the caliper 1.

The pressure gauge 62 can be both located at the electric connector 34, and in proximity of the external mounting surface 51. The pressure gauge 62 can be located in the proximity of the injection device 61, or opposite to the same with respect to the air circulation space formed by the duct 4 and the inner space 33.

When the pressure gauge 62 is located in the proximity of the external mounting surface 51, it is for example used to detect a pressure increase, which would be caused by a leak in this place, when pressurised air is injected into the duct 4 through the electric connector 34.

The caliper 1 could also be free from a seal 5 between the mounting surface 51 and the inlet casing 21.

The caliper 1 can in particular be configured to ensure wheel braking, when the vehicle moves forward at high speed. The caliper 1 can be a fixed caliper.

Of course, the implementation of a hydraulic electric mixed brake does not depart from the scope of the present invention. Advantageously, the service braking is ensured by hydraulic means of a known type whereas the parking and/or emergency braking is ensured by an electric motor.

NOMENCLATURE IN REFERENCE TO THE FIGURES

1: brake caliper
2: caliper body
3: electromechanical actuator
4: duct
5: tight seal
6: tightness monitoring system
7: transmission device
11: brake disc
12: piston
21: inlet casing
31: external casing
32: motor
33: inner space
34: electric connector
41: electric cable
51: external mounting surface
61: air injection device
62: pressure gauge
64: computer processing unit
65: alert device
71: first gear train
72: second gear train
73: third gear train
81: battery
82: electric cable
84: female electric connector
101: step of connecting the duct to the pressure varying device
102: step of measuring pressure
103: step of measuring the duration necessary for the pressure measurement to reach a determined value
105: step of comparing the duration measurement to a reference duration
107: arrow
109: arrow
111: step of signalling a tightness fault
113: step of signalling the absence of tightness fault

The invention claimed is:

1. An electromechanical brake actuator for a vehicle, comprising:
   a motor;
   a casing delimiting an inner space enclosing the motor;
   an electric connector opening outwardly of the actuator;
   a duct provided in a wall of the casing, wherein an electric conductor is located in the duct, wherein the electric conductor electrically connects the motor to the electric connector;
   wherein the duct is configured to allow fluid to circulate in a space delimited by the electric conductor and by the wall of the casing, through the electric connector and between the electric connector and the inner space.

2. The actuator according to claim 1, wherein the electric connector is configured to be connected to a complementary electric connector, wherein the electric connector is configured to be fluid tight when connected to the complementary electric connector.

3. A brake caliper comprising:
   a caliper body; and
   an actuator according to claim 1;
   wherein the casing comprises a mounting surface to tightly couple the actuator to the caliper body.

4. The brake caliper according to claim 3, wherein the caliper body is a floating caliper body.

5. The brake caliper according to claim 3, further comprising a seal between the actuator and the caliper body, wherein the duct is configured to test fluid tightness between the actuator and the caliper body.

6. A method for checking tightness of a brake caliper according to claim 3, comprising:
   connecting the duct to a pressure varying device, for varying fluid pressure in the caliper.

7. The method for checking tightness according to claim 6, wherein the fluid is air.

8. The method for checking tightness according to claim 6, further comprising:
   measuring a value representative of the fluid pressure at the electric connector.

9. The method for checking tightness according to claim 6, further comprising:
   measuring a value representative of the fluid pressure at the mounting surface.

10. The method for checking tightness according to claim 6, further comprising:
   measuring a duration necessary for a value representative of the pressure to reach a determined pressure value;
   comparing the duration measurement to a reference duration; and
   emitting a signal representative of a tightness fault of the caliper if absolute value of the deviation between the duration measurement and the reference duration exceeds a threshold value.

* * * * *